(12) United States Patent
Min et al.

(10) Patent No.: US 8,212,785 B2
(45) Date of Patent: Jul. 3, 2012

(54) OBJECT SEARCH METHOD AND TERMINAL HAVING OBJECT SEARCH FUNCTION

(75) Inventors: Zee Young Min, Anyang-si (KR); Yoo Mee Song, Seoul (KR); Kye Sook Jeong, Seoul (KR); Jin A. Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 818 days.

(21) Appl. No.: 12/027,135

(22) Filed: Feb. 6, 2008

(65) Prior Publication Data

US 2008/0252611 A1   Oct. 16, 2008

(30) Foreign Application Priority Data

Apr. 13, 2007 (KR) .................. 10-2007-0036463

(51) Int. Cl.
*G06F 3/041* (2006.01)

(52) U.S. Cl. .................. 345/173; 715/700; 715/863

(58) Field of Classification Search .................. 345/173, 345/156, 168; 715/863
See application file for complete search history.

(56) References Cited

U.S. PATENT DOCUMENTS

| | | |
|---|---|---|
| 6,433,801 B1 | 8/2002 | Moon et al. |
| 2004/0140956 A1* | 7/2004 | Kushler et al. ............... 345/168 |
| 2006/0033724 A1 | 2/2006 | Chaudhri et al. |
| 2006/0161870 A1* | 7/2006 | Hotelling et al. ............. 715/863 |
| 2006/0197753 A1* | 9/2006 | Hotelling .................... 345/173 |
| 2007/0072633 A1 | 3/2007 | Cheon et al. |

FOREIGN PATENT DOCUMENTS

| | | |
|---|---|---|
| CN | 1838053 A | 9/2006 |
| CN | 101059744 | 10/2007 |
| EP | 1 768 364 A2 | 3/2007 |
| TW | 548578 B | 8/2003 |
| TW | I239480 B | 9/2005 |
| WO | 2006/027434 A2 | 3/2006 |

* cited by examiner

*Primary Examiner* — Quan-Zhen Wang
*Assistant Examiner* — Troy Dalrymple
(74) *Attorney, Agent, or Firm* — Birch, Stewart, Kolasch & Birch, LLP

(57) ABSTRACT

An object search method, computer program product, and a terminal having an object search function are disclosed. The object search method includes: displaying a list of a plurality of objects including a first object and a second object in a first screen area, and displaying a touch input window for touch input in a second screen area; touching a first position on the touch input window with a pointer and then dragging the pointer to a second position on the touch input window; and moving an object indicator from the first object to the second object on the list as the pointer is dragged from the first position to the second position. Therefore, it is possible to efficiently search for an object.

18 Claims, 9 Drawing Sheets

OBJECT SEARCH METHOD AND TERMINAL HAVING OBJECT SEARCH FUNCTION

CROSS REFERENCE TO RELATED APPLICATIONS

This application claims the priority benefit of Korean Patent Application No. 10-2007-0036463, filed on Apr. 13, 2007, which is hereby incorporated by reference as if fully set forth herein.

BACKGROUND OF THE INVENTION

1. Field of the Invention

The present invention relates to an object search method, a computer program product and a terminal having an object search function.

2. Discussion of the Related Art

An object search process of a conventional terminal is performed as follows.

First, where the terminal has a touch screen, it searches for an object when any position of a scroll bar provided on the touch screen is touched by a pointer or the pointer is dragged from any position to another position on the scroll bar. Alternatively, the terminal may search for an object touched directly by the pointer, among a plurality of objects displayed on the touch screen.

On the other hand, where the terminal has no touch screen, it searches for an object in any direction in response to a direction signal inputted through a direction key provided therein.

However, in the above-mentioned conventional terminal, there is no scheme capable of searching for an object corresponding to a touch direction or speed of the touch screen.

In addition, in the conventional terminal, a display does not provide an information display area and a signal input area separately.

SUMMARY OF THE INVENTION

Accordingly, the present invention is directed to an object search method, a computer program product and a terminal having an object search function that substantially obviate one or more problems due to limitations and disadvantages of the related art.

An object of the present invention is to provide a terminal which has a display divided into an information display area and a signal input area, and a method using the same.

Another object of the present invention is to provide a method and a computer program product which is capable of performing an object search process corresponding to a drag direction or speed for a signal input area provided on a touch screen, and a terminal implemented with the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a computer program product and corresponding object search method comprises: displaying a list of a plurality of objects including a first object and a second object in a first screen area, and displaying a touch input window for touch input in a second screen area; touching a first position on the touch input window with a pointer and then dragging the pointer to a second position on the touch input window; and moving an object indicator from the first object to the second object on the list as the pointer is dragged from the first position to the second position.

In another aspect of the present invention, a terminal having an object search function comprises: a display unit configured to display a list of a plurality of objects including a first object and a second object in a first screen area, and display a touch input window for touch input in a second screen area; and a controller configured to move an object indicator from the first object to the second object on the list as a pointer is dragged from a first position to a second position on the touch input window.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

Figure 1:
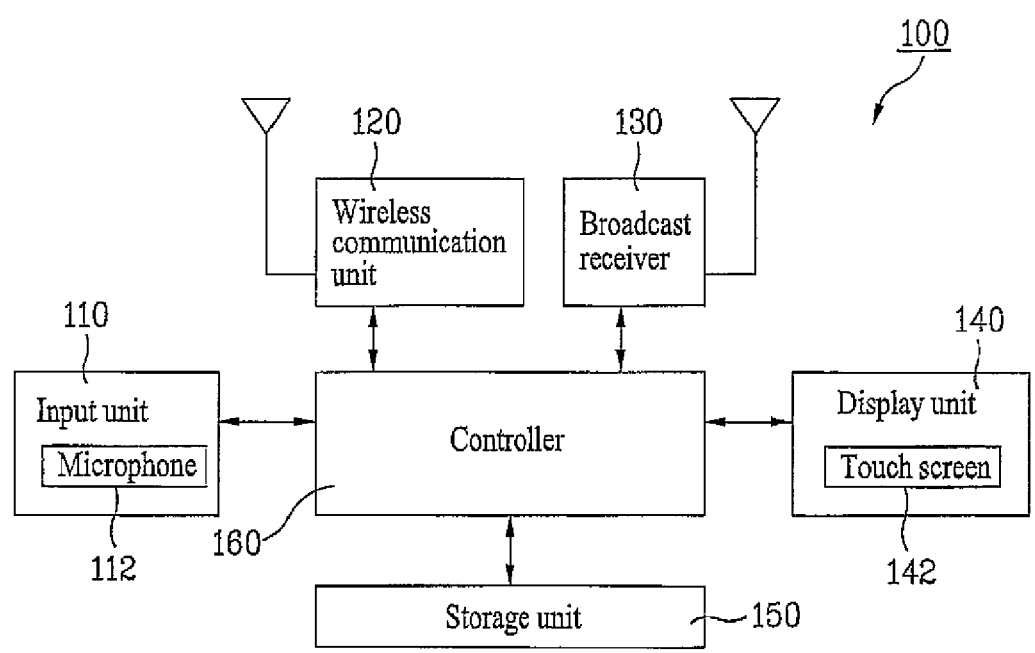
FIG. 1 is a block diagram showing an embodiment of a terminal with an object search function according to the present invention.

FIG. 1 is a block diagram showing an embodiment of a terminal with the object search function according to one embodiment of the present invention.

As shown in FIG. 1, the terminal 100 according to the present embodiment comprises an input unit 110, a wireless communication unit 120, a broadcast receiver 130, a display unit 140, a storage unit 150, and a controller 160. The input unit 110 includes a microphone 112 for receiving an external audio signal. The display unit 140 includes a touch screen 142.

The input unit 110 receives an input operation from a user of the terminal 100 and generates a signal corresponding to the received input operation. The wireless communication unit 120 transmits/receives data to/from an external terminal or server over a wireless communication network. Here, the data may include audio data or video data based on call connection, audio data, video data or text data based on message transmission/reception, and various types of data based on wireless Internet connection. The broadcast receiver 130 receives a broadcast from a broadcast channel over a broadcast network. Here, the broadcast may include, not only a television (TV) broadcast, radio broadcast or data broadcast, but also a combination of data with a TV broadcast or radio broadcast. The display unit 140 displays various information related to the terminal 100. The touch screen 142 is provided in the display unit 140 to sense a touch by a pointer and display information corresponding to the sensed touch. The touch screen 142 acts as an input device and display device. The storage unit 150 stores, not only all data inputted/outputted to/from the terminal 100, but also all programs necessary to the operation of the terminal 100. The controller 160 controls the entire operation of the terminal 100. The controller 160 also controls the above-mentioned components 110, 120, 130, 140 and 150 such that they can be organically operated.

An object to be hereinafter described corresponds to data which is a target to be searched for, among the data stored in the storage unit 150. For example, the object may include at least one of a menu item, a telephone number, a name set for a telephone number, an incoming/outgoing message, a multimedia file, and a broadcast channel.

An object indicator to be hereinafter described signifies means for indicating a currently searched object. For example, the object indicator may include a cursor, highlight or the like.

Particularly, in the present embodiment, the display unit 140 displays a list of a plurality of objects including a first object and a second object in a first screen area, and displays a touch input window for touch input in a second screen area. Here, the second screen area is provided on the touch screen 142. On the other hand, the first screen area may be provided on the touch screen 142 or may not.

Figure 2:
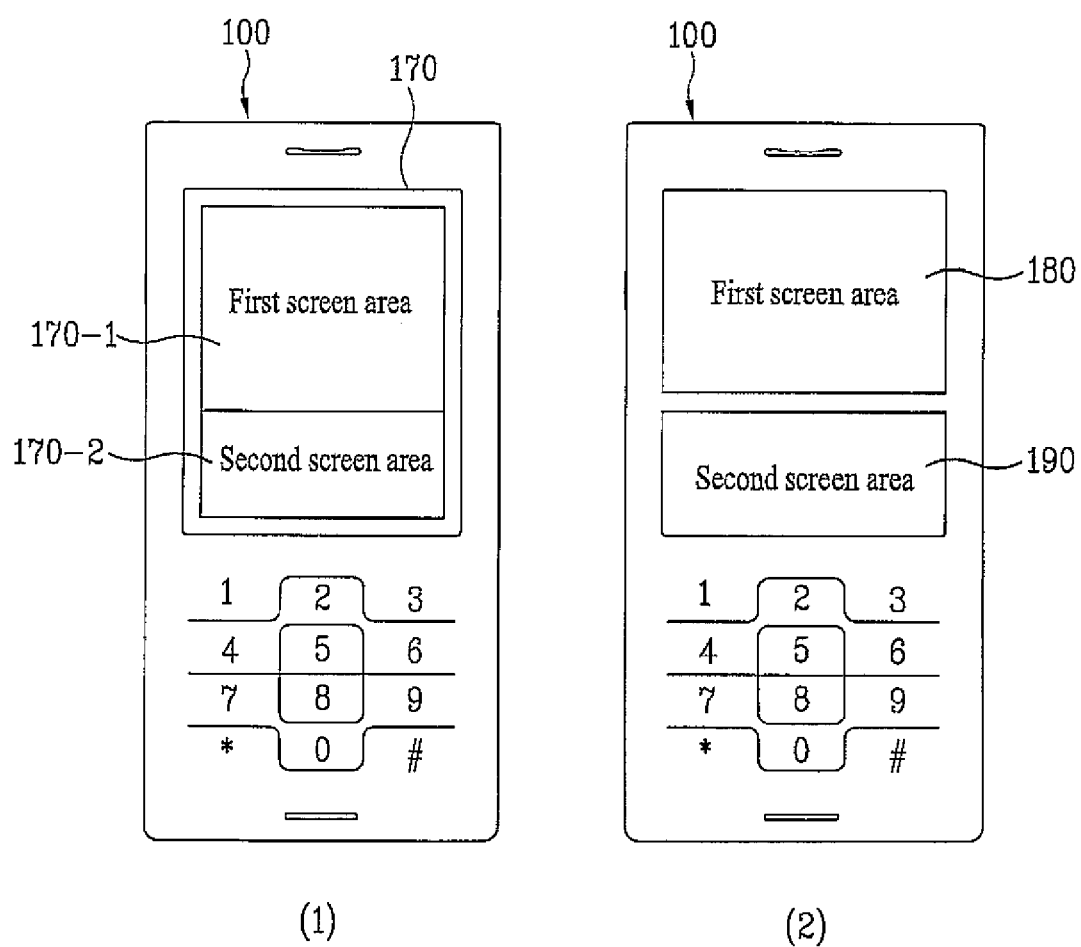
FIG. 2 is a state diagram illustrating an embodiment of screen areas displayed on a display according to the present invention.

For example, as shown in (1) of FIG. 2, the terminal 100 may divide the screen of one display 170 into a plurality of screen areas including a first screen area 170-1 and a second screen area 170-2, and display the object list in the first screen area 170-1 and the touch input window in the second screen area 170-2, respectively. Here, the second screen area 170-2 is provided on the touch screen.

Alternatively, as shown in (2) of FIG. 2, the terminal 100 may include first display 180 and second display 190, and display the first screen area on the first display 180 and the second screen area on the second display 190, respectively. Here, the second display 190 includes the touch screen.

Particularly, in the present embodiment, the controller 160 moves the object indicator from the first object to the second object on the object list displayed in the first screen area as the pointer is dragged from a first position to a second position on the touch input window displayed in the second screen area, which will be described later in more detail.

In addition, the controller 160 can execute function(s) related to an object where the object indicator is currently located, in various ways, which will be described later in more detail.

Figure 3:
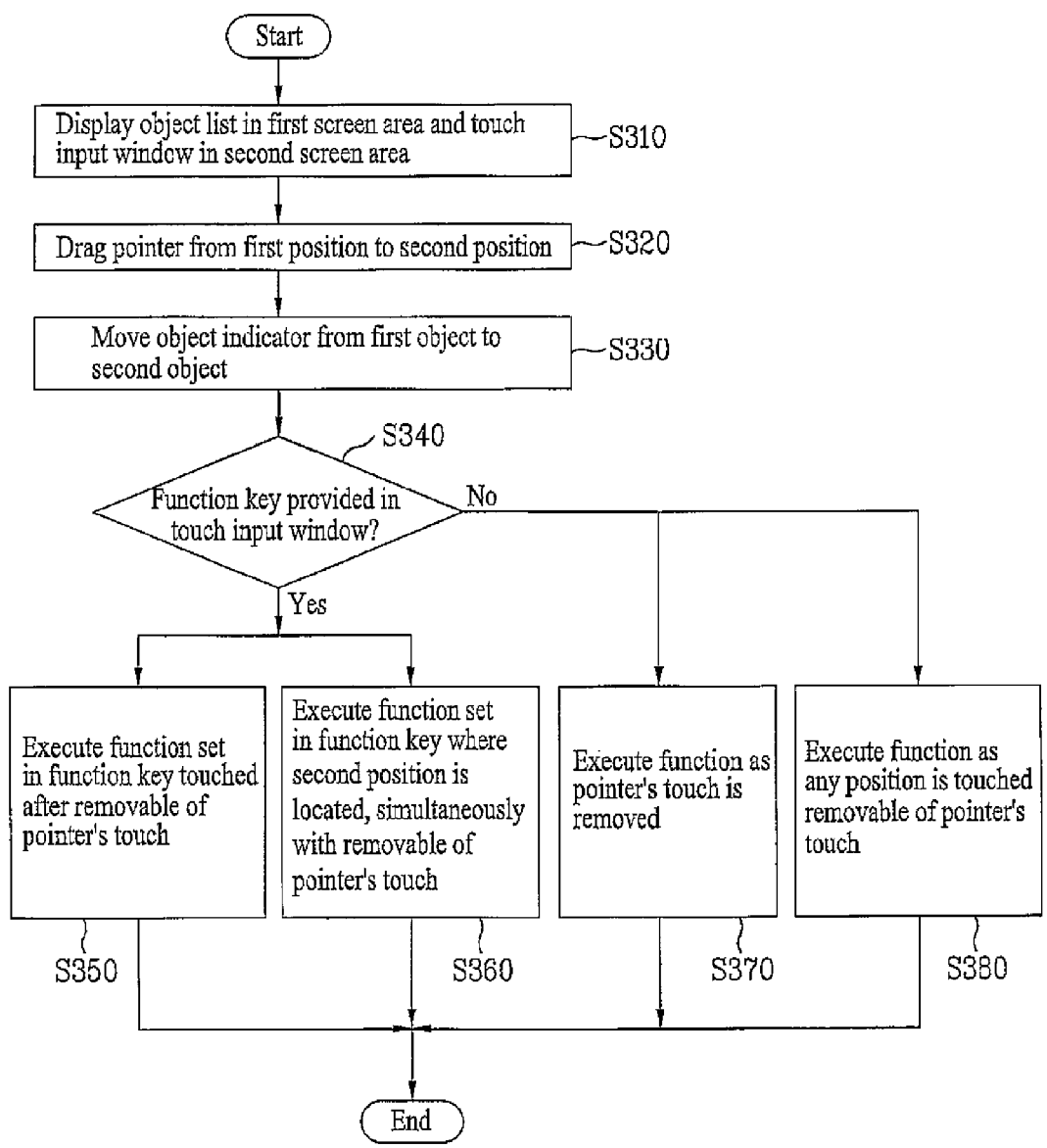
FIG. 3 is a flowchart illustrating an embodiment of an object search process of the terminal according to the present invention.

An object search process of the terminal according to the present invention will hereinafter be described in detail with reference to FIG. 3. FIG. 3 is a flowchart illustrating an embodiment of the object search process of the terminal according to the present invention.

The terminal 100 displays a list of a plurality of objects including a first object and a second object in a first screen area, and displays a touch input window for touch input in a second screen area (S310).

Here, the first screen area and the second screen area may be provided in one display or each of them may be provided in a corresponding one of a plurality of displays. Also, the second screen area is provided on the touch screen 142.

The user of the terminal 100 touches a first position on the touch input window with the pointer and then drags the pointer to a second position on the touch input window (S320).

As the pointer is dragged from the first position to the second position, the terminal 100 moves the object indicator from the first object to the second object on the list (S330).

At the moving step S330, the terminal 100 may move the object indicator among only a plurality of objects, selected from the plurality of objects constituting the list based on predetermined criteria, according to the user's selection. For example, the predetermined criteria may include preselection by the user or frequency of use above a predetermined value.

At the moving step S330, the terminal 100 may move the object indicator in proportion to at least one of a drag speed and drag distance of the pointer.

For example, the terminal 100 may move the object indicator farther when the drag distance is longer where the drag speed is constant. Alternatively, the terminal 100 may move the object indicator farther when the drag speed is higher where a drag time is the same. Alternatively, the terminal 100 may move the object indicator farther when the drag speed is higher where the drag distance is constant.

At the moving step S330, the terminal 100 may move the object indicator correspondingly to the drag direction of the pointer.

Figure 4:
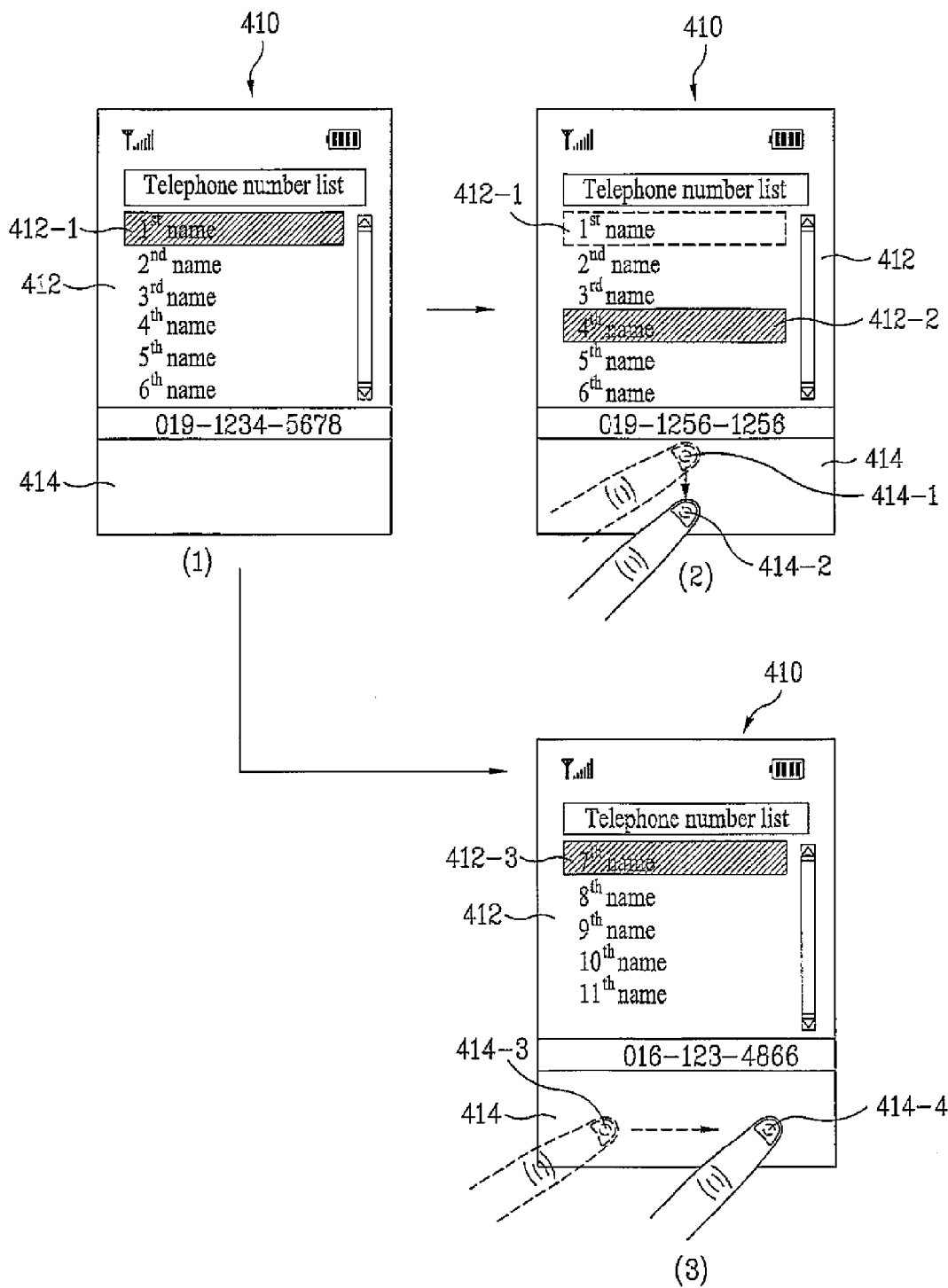
FIG. 4 is a state diagram illustrating an embodiment of an object search process based on a drag direction of a pointer according to the present invention.

For example, as shown in FIG. 4, the terminal 100 may display a list of names set respectively for a plurality of telephone numbers in a first screen area 412 on one display 410 and the touch input window in a second screen area 414 thereon, respectively (1). Here, a telephone number corresponding to a name where the object indicator is located is displayed at the bottom of the first screen area 412. The object indicator is a highlight.

Thereafter, as the pointer is dragged from a first position 414-1 to a second position 414-2, which is located under the first position 414-1, on the touch input window, the terminal 100 may move the object indicator from a first name 412-1 to a fourth name 412-2 in the list, which is located under the first name 412-1 (2). Here, the terminal 100 moves the object indicator 'down' when the drag direction is 'down'.

Alternatively, as the pointer is dragged from a third position 414-3 to a fourth position 414-4, which is located at the right-hand side of the third position 414-3, on the touch input window, the terminal 100 may move the object indicator from a first page to a second page of the list to display the second page of the list (3).

Further, the terminal 100 may set moving direction of the object indicator by drag direction according to the user's selection. As a result, although not shown in FIG. 4, the terminal 100 may move the object indicator 'down' even when the drag direction is 'right'.

Turning again to FIG. 3, the terminal 100 determines whether there is a function key provided in the touch input window (S340).

Here, the function key means a key for receiving a signal input from the user for execution of a specific function related to an object where the object indicator is currently located. The function key may be at least one. In addition, the function key may be different according to what is an object where the object indicator is currently located.

The object search process will hereinafter be described additionally under the condition that it is classified into the case where there is a function key provided in the touch input window and the case where there is no function key provided in the touch input window.

Upon determining that there is a function key provided in the touch input window, the terminal 100 executes a function set in the function key with respect to the second object when the function key is touched by the pointer after the touch of the pointer on the second position is removed (S350).

Alternatively, if it is determined that there is a function key provided in the touch input window, the terminal 100 may execute a function set in the function key where the second position is located, with respect to the second object, at the same time that the touch of the pointer on the second position is removed (S360).

The above step S350 and step S360 will be described later in more detail with reference to FIG. 5A and FIG. 6A.

On the other hand, in the case where it is determined that there is no function key provided in the touch input window, the terminal 100 performs a function related to the second object as the touch of the pointer on the second position is removed (S370).

Alternatively, in the case where it is determined that there is no function key provided in the touch input window, the terminal 100 may perform a function related to the second object as a desired position on the touch input window is touched by the pointer after the touch of the pointer on the second position is removed (S380).

The above step S370 and step S380 will be described later in more detail with reference to FIG. 5B and FIG. 6B.

Figure 5A:
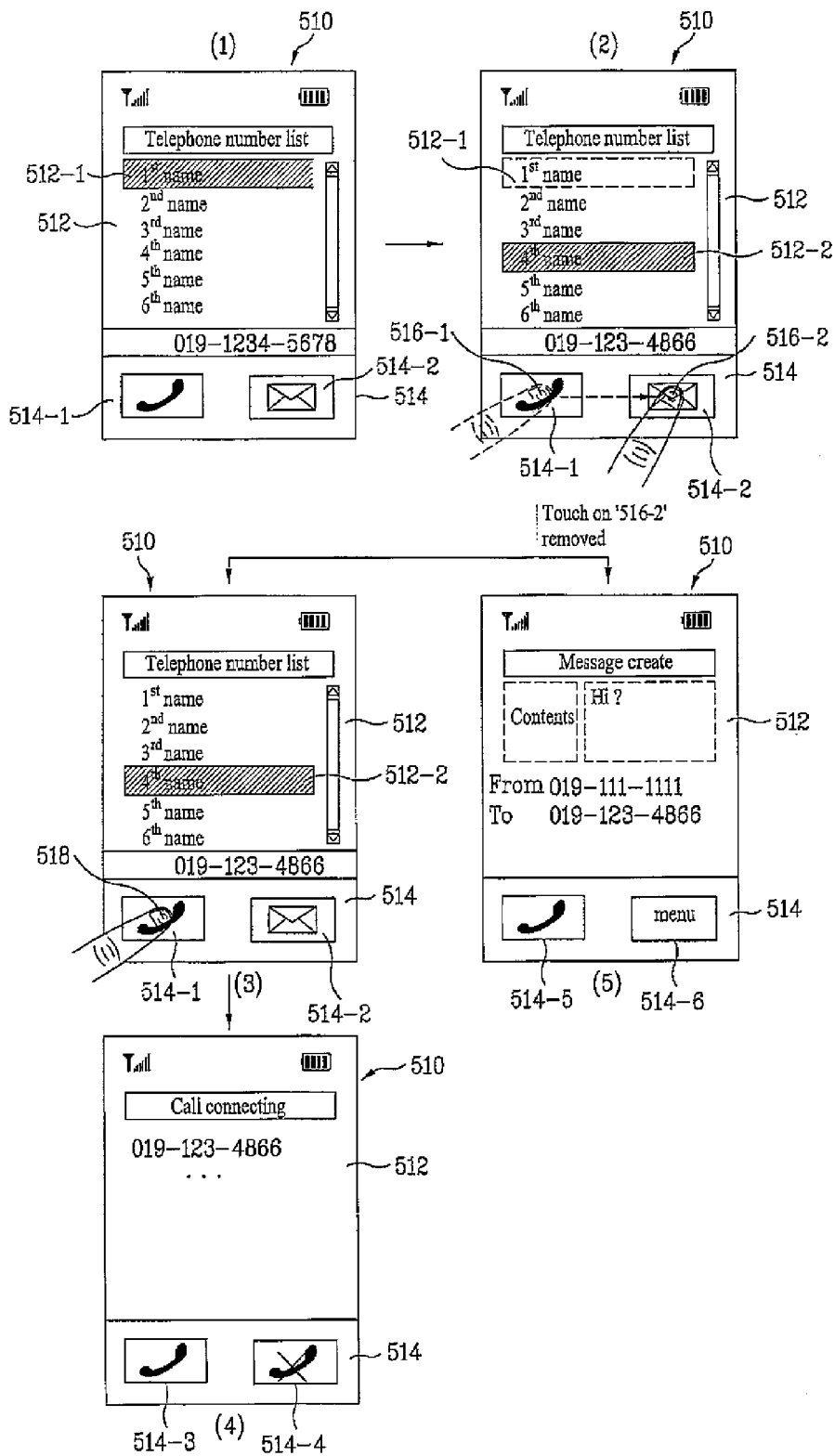
FIG. 5A is a state diagram illustrating a first embodiment of an object search and execution process when there is a function key provided in a touch input window, according to the present invention.

With reference to FIG. 5A, a detailed description will hereinafter be given of an object search and execution process in the case where there is a function key provided in the touch input window. FIG. 5A illustrates an object search and execution process when an object is a name set for a telephone number.

The terminal 100 displays a list of a plurality of names set respectively for a plurality of telephone numbers in a first screen area 512 and displays a send key 514-1 and a message key 514-2 as function keys on a touch input window in a second screen area 514 (1). Here, a telephone number corresponding to a first name 512-1 where the object indicator is currently located is displayed at the bottom of the first screen area 512.

As the pointer is dragged from a first position 516-1 to a second position 516-2 on the touch input window, the terminal 100 moves the object indicator from the first name 512-1 to a fourth name 512-2 (2).

As a desired position 518 on the send key 514-1 is touched by the pointer after the touch of the pointer on the second position 516-2 is removed (3), the terminal 100 connects a call to a telephone number corresponding to the fourth name 512-2 (4).

At this time, in the state (4), the terminal 100 may display a send key 514-3 and an end key 514-4 in the second screen area 514 as function keys set to functions related to the call connection.

Also, although not shown in FIG. 5A, when a desired position on the message key 514-2 is touched by the pointer in the state (3), the terminal 100 may set a mode of creating a message to be transmitted to the telephone number corresponding to the fourth name 512-2.

Alternatively, when the touch of the pointer on the second position 516-2 is removed, the terminal 100 may determine that the second position 516-2 is located in the message key 514-2, and set the mode of creating the message to be transmitted to the telephone number corresponding to the fourth name 512-2 (5).

At this time, in the state (5), the terminal 100 may display a send key 514-5 and a menu key 514-6 in the second screen area 514 as function keys set to functions that can be executed in the message creation mode.

Figure 5B:
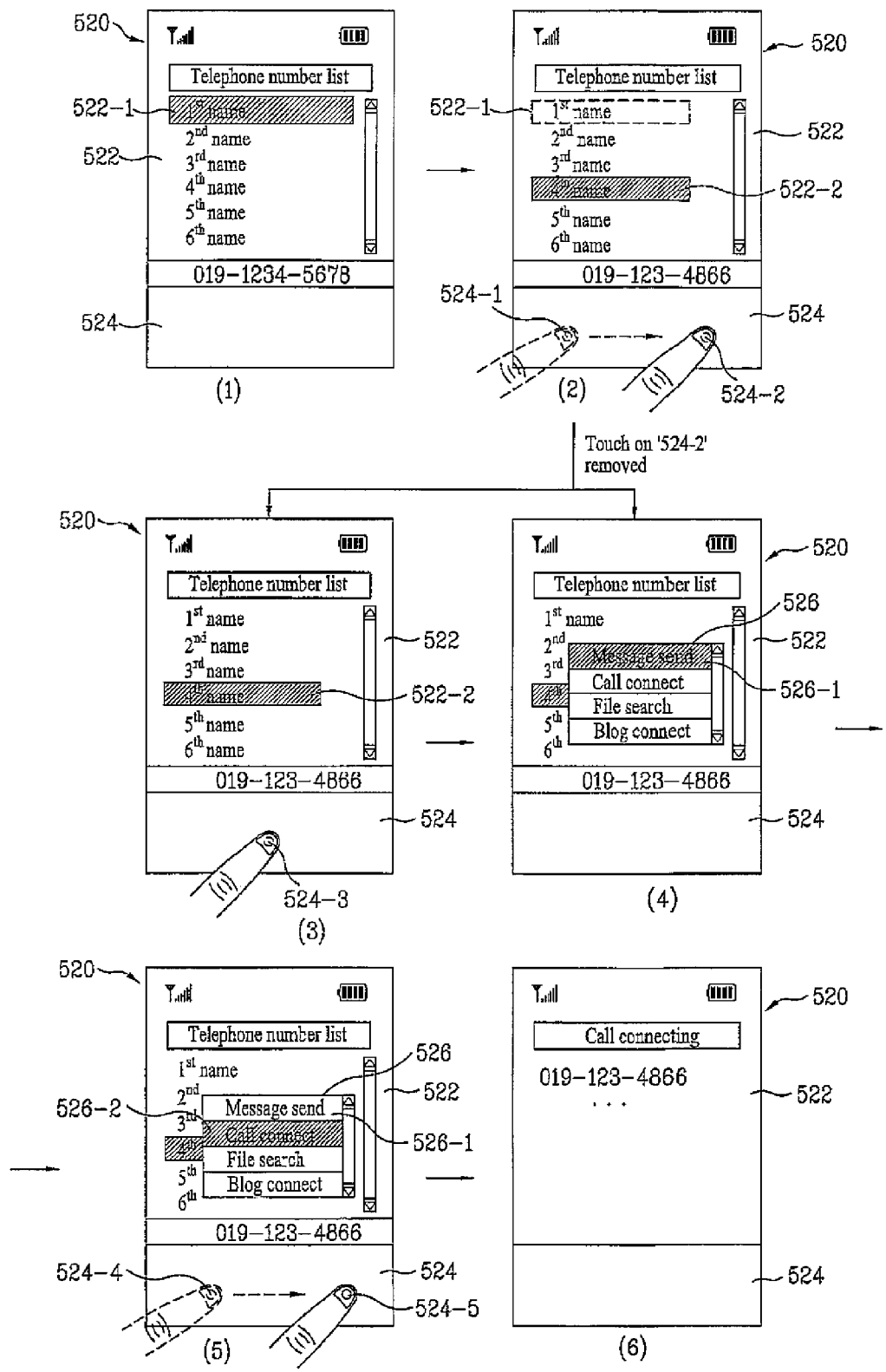
FIG. 5B is a state diagram illustrating a first embodiment of an object search and execution process when there is no function key provided in the touch input window, according to the present invention.

With reference to FIG. 5B, a detailed description will hereinafter be given of an object search and execution process in the case where there is no function key provided in the touch input window. FIG. 5B illustrates an object search and execution process when an object is a name set for a telephone number.

The terminal 100 displays a list of a plurality of names set respectively for a plurality of telephone numbers in a first screen area 522 and displays a touch input window in a second screen area 524 (1). Here, a telephone number corresponding to a first name 522-1 where the object indicator is currently located is displayed at the bottom of the first screen area 522.

As the pointer is dragged from a first position 524-1 to a second position 524-2 on the touch input window, the terminal 100 moves the object indicator from the first name 522-1 to a fourth name 522-2 (2).

As a third position 524-3 on the touch input window is touched by the pointer after the touch of the pointer on the second position 524-2 is removed (3), the terminal 100 displays a list 526 of functions related to a telephone number corresponding to the fourth name 522-2 (4). Here, the functions constituting the list 526 may include a message sending function 526-1, a call connection function (526-2), a function of searching for files associated with a telephone number or a name set for the telephone number, and a function for connection to a blog which is managed on the Internet by a person corresponding to a name set for a telephone number.

On the other hand, as the touch of the pointer on the second position 524-2 is removed, the terminal 100 may enter the state (4) directly without experiencing the state (3).

As the pointer is dragged from a fourth position 524-4 to a fifth position 524-5 on the touch input window, the terminal

100 moves the object indicator from the message sending function 526-1 to the call connection function 526-2 on the list 526 (5).

When the touch of the pointer on the fifth position 524-5 is removed or when a desired position on the touch input window is touched by the pointer after the touch of the pointer on the fifth position 524-5 is removed, the terminal 100 connects a call to the telephone number corresponding to the fourth name 522-2 (6).

Figure 6A:
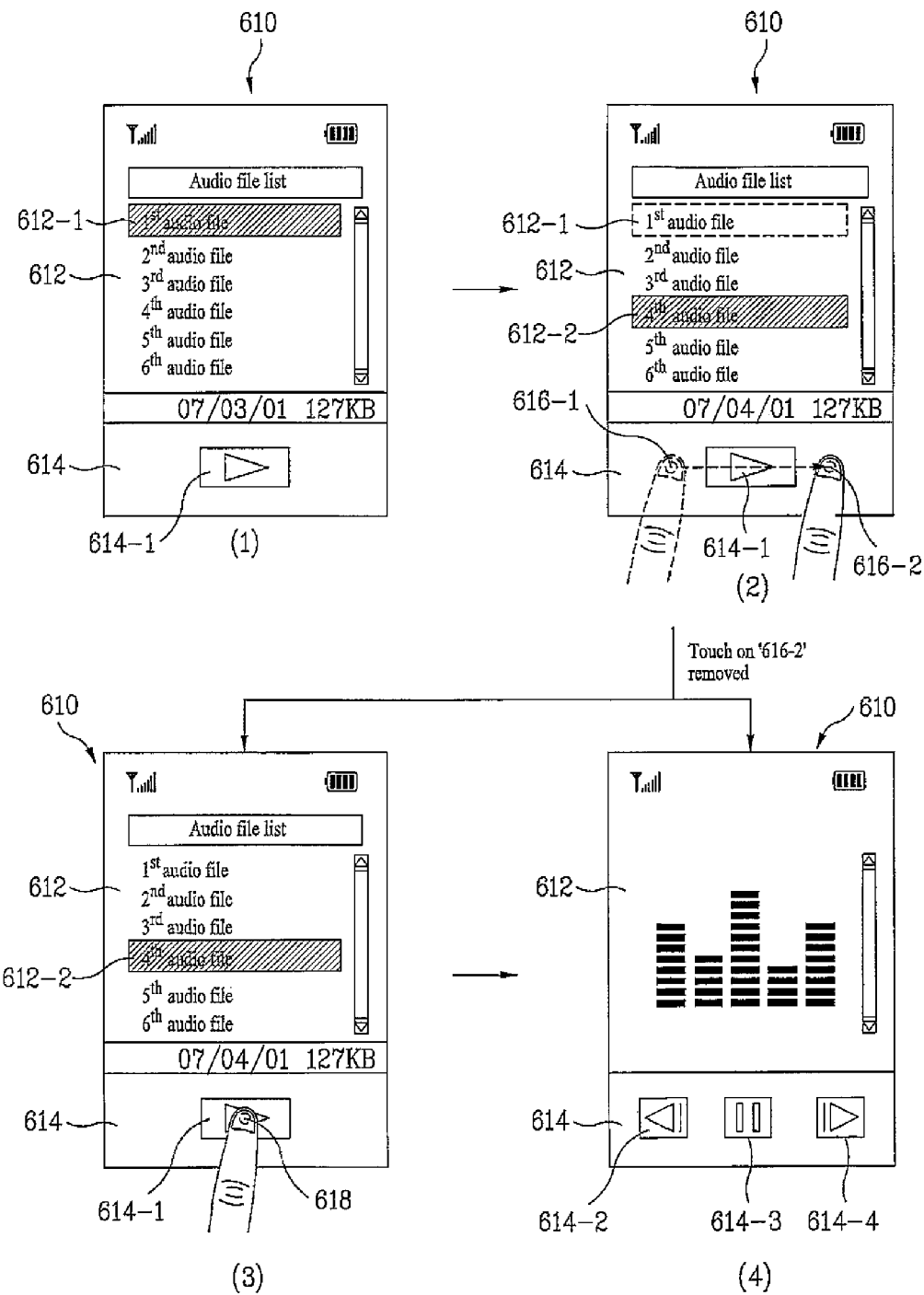
FIG. 6A is a state diagram illustrating a second embodiment of the object search and execution process when there is a function key provided in the touch input window, according to the present invention.

With reference to FIG. 6A, a detailed description will hereinafter be given of an object search and execution process in the case where there is a function key provided in the touch input window. FIG. 6A illustrates an object search and execution process when an object is a audio file.

The terminal 100 displays a list of a plurality of audio files in a first screen area 612 and displays a play key 614-1 as a function key on a touch input window in a second screen area 614 (1). Here, information about a first audio file 612-1 where the object indicator is currently located is displayed at the bottom of the first screen area 612.

As the pointer is dragged from a first position 616-1 to a second position 616-2 on the touch input window, the terminal 100 moves the object indicator from the first audio file 612-1 to a fourth audio file 612-2 (2).

As a desired position 618 on the play key 614-1 is touched by the pointer after the touch of the pointer on the second position 616-2 is removed (3), the terminal 100 plays the fourth audio file 612-2 (4).

At this time, in the state (4), the terminal 100 may display a rewind key 614-2, a stop key 614-3 and a fast forward key 614-4 in the second screen area 614 as function keys set to functions related to the audio file play operation.

For example, when the pointer is dragged from one position to another position, which is located at the right-hand side of that position, on the touch input window in the state (4), the terminal 100 may play a portion of the fourth audio file 612-2 located behind a currently played portion of the fourth audio file 612-2. Alternatively, when the pointer is dragged from one position to another position, which is located at the left-hand side of that position, on the touch input window in the state (4), the terminal 100 may play a portion of the fourth audio file 612-2 located ahead of the currently played portion of the fourth audio file 612-2.

On the other hand, the terminal 100 may enter the state (4) directly without experiencing the state (3).

Figure 6B:
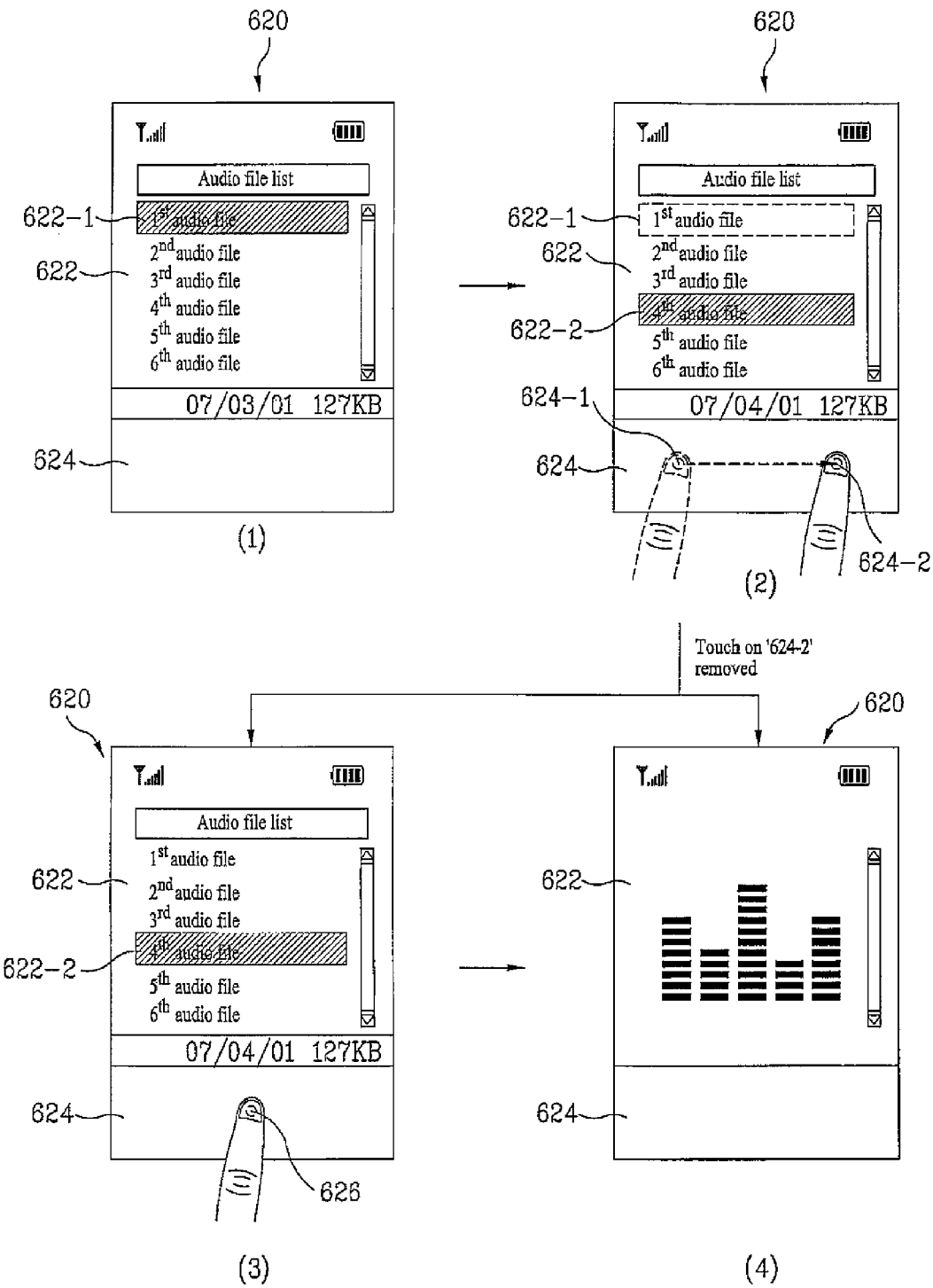
FIG. 6B is a state diagram illustrating a second embodiment of the object search and execution process when there is no function key provided in the touch input window, according to the present invention.

With reference to FIG. 6B, a detailed description will hereinafter be given of an object search and execution process in the case where there is no function key provided in the touch input window. FIG. 6B illustrates an object search and execution process when an object is an audio file.

The terminal 100 displays a list of a plurality of audio files in a first screen area 622 and displays a touch input window in a second screen area 624 (1). Here, information about a first audio file 622-1 where the object indicator is currently located is displayed at the bottom of the first screen area 622.

As the pointer is dragged from a first position 624-1 to a second position 624-2 on the touch input window, the terminal 100 moves the object indicator from the first audio file 622-1 to a fourth audio file 622-2 (2).

As a desired position 626 on the touch input window is touched by the pointer after the touch of the pointer on the second position 624-2 is removed (3), the terminal 100 plays the fourth audio file 622-2 (4).

On the other hand, the terminal 100 may enter the state (4) directly without experiencing the state (3).

Figure 7A:
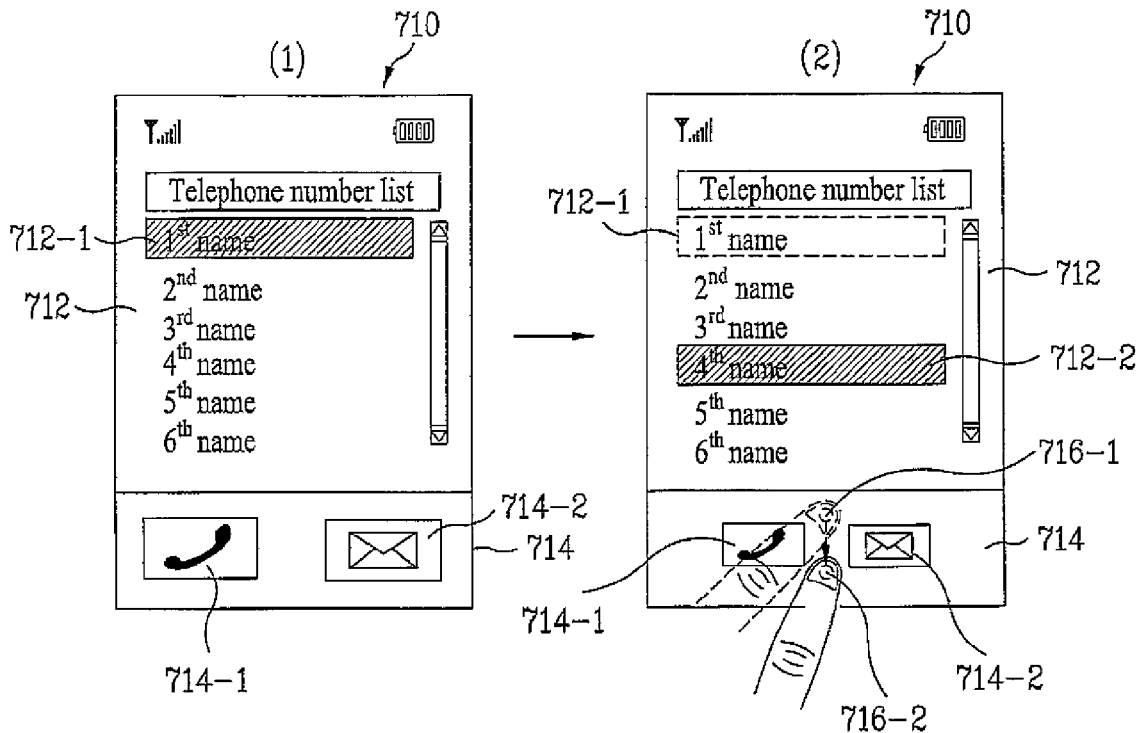
FIG. 7A is a state diagram illustrating an embodiment of a function key movement and display process based on a drag position of the pointer when there is a function key provided in the touch input window, according to the present invention.
Figure 7B:
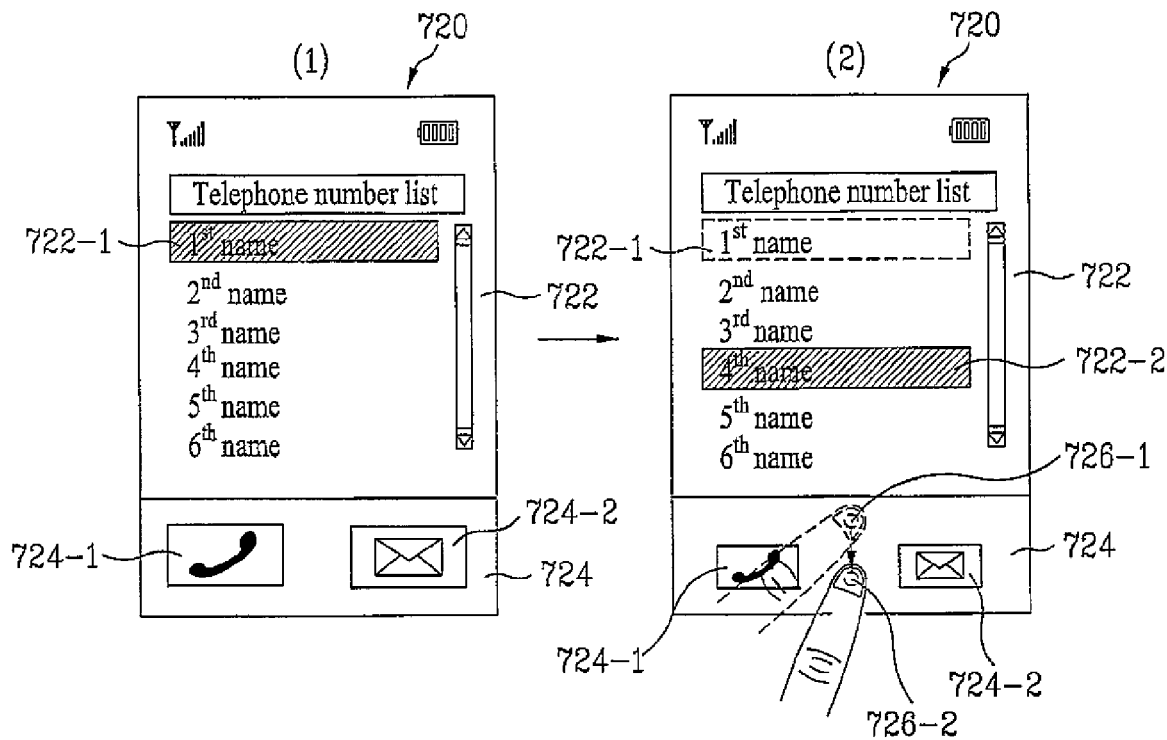
FIG. 7B is a state diagram illustrating an embodiment of a function key movement and display process based on a drag direction of the pointer when there is a function key provided in the touch input window, according to the present invention.

With reference to FIG. 7A and FIG. 7B, a detailed description will hereinafter be given of a function key movement and display process based on a drag position of the pointer and a drag direction of the pointer in the case where there is a function key provided in the touch input window.

As shown in FIG. 7A, the terminal 100 displays a list of a plurality of names set respectively for a plurality of telephone numbers in a first screen area 712 and displays a send key 714-1 and a message key 714-2 on a touch input window in a second screen area 714 (1).

As the pointer is dragged from a first position 716-1 to a second position 716-2 in a space between the send key 714-1 and the message key 714-2, the terminal 100 moves and displays the send key 714-1 and the message key 714-2 by a certain distance to the center of the second screen area 714 (2). At this time, the area of each of the send key 714-1 and message key 714-2 may be reduced to a certain area.

When the drag operation is completed in the state (2), the terminal 100 restores the position and area of each of the send key 714-1 and message key 714-2 to the original.

As shown in FIG. 7B, the terminal 100 displays a list of a plurality of names set respectively for a plurality of telephone numbers in a first screen area 722 and displays a send key 724-1 and a message key 724-2 on a touch input window in a second screen area 724 (1).

As the pointer is dragged from a first position 726-1 to an underlying second position 726-2 in a space between the send key 724-1 and the message key 724-2, the terminal 100 moves and displays the send key 724-1 and the message key 724-2 down by a certain distance (2). At this time, the area of each of the send key 724-1 and message key 724-2 may be reduced to a certain area.

When the drag operation is completed in the state (2), the terminal 100 restores the position and area of each of the send key 724-1 and message key 724-2 to the original.

Besides the above-described embodiments, various embodiments will be possible which provide graphics corresponding to the drag operation of the user through the first screen area or second screen area in various ways.

In the preceding discussion of embodiments, the use of a single touch was described. However, it is also possible for the functions previously described to be initiated or terminated with a predetermined sequence of touches (e.g., a quick double touch) to prevent an accidental initiation. Alternatively, the touch may be replaced with a predetermined swipe design, such a tracing a 'check', a circular pattern, or an 'x' on the touch screen. Also, the touch of a finger may be replaced by using a stylus or another touch tool. Also, the transition between operations associated with swiping to operations associated with touching may be facilitated by a touch or another input. For example, the swiping function may be first enabled or disabled by double-touch, whereas single touches are used to execute highlighted functions.

Also, in the previous embodiments, the first screen was described as not being touch sensitive. However, in another embodiment, the first screen may also be touch sensitive, so that the second screen is used for swiping (or swiping and touching) actions, whereas the first screen is used for touching actions. Thus, a list may be scrolled by swiping the second screen, while operations may be initiated or stopped by touching list items or icons on the first screen.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

As apparent from the above description, the present invention has effects as follows.

Firstly, a screen area for display of an object list and a screen area for display of a touch input window for touch input can be provided separately.

Secondly, an object search operation can be executed correspondingly to at least one of a drag direction, drag distance and drag speed of a pointer on the touch input window.

Thirdly, various functions related to a searched object can be executed using function keys provided on the touch input window.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An object search method, comprising:
    displaying a list of a plurality of objects including a first object and a second object in a first screen area, and displaying a touch input window for touch input in a second screen area, the touch input window including one or more function keys;
    receiving a touch input on a first position with a pointer on the touch input window and then receiving an input corresponding to dragging the pointer to a second position on the touch input window;
    moving an object indicator from the first object to the second object on the list as the pointer is dragged from the first position to the second position; and
    executing a function set in a first function key if the second position and the first function key are at least partially overlapped with each other when the touch of the pointer on the second position is removed,
    wherein the first function key is located on a predetermined position on the touch input window, and
    wherein a region for receiving the touch input causing the movement of the object indicator is not provided on the first screen area.

2. The object search method of claim 1, wherein the first screen area and the second screen area are provided in one display or respectively in one of a plurality of displays.

3. The object search method of claim 1, wherein the second screen area is provided on a touch screen.

4. The object search method of claim 1, wherein the step of moving comprises moving the object indicator in proportion to at least one of a drag speed and a drag distance of the pointer.

5. The object search method of claim 1, wherein the step of moving comprises moving the object indicator correspondingly to a drag direction of the pointer.

6. The object search method of claim 1, wherein each of the objects includes at least one of a menu item, a telephone number, a name set for a telephone number, an incoming/outgoing message, a multimedia file, and a broadcast channel.

7. The object search method of claim 1, further comprising:
    displaying a second function key while moving a position thereof corresponding to at least one of a drag direction and a drag position of the pointer.

8. The object search method of claim 1, further comprising:
    varying a configuration of the one or more function keys according to an object type of the first object or an object type of the second object.

9. The object search method of claim 1, further comprising:
    searching the list of the plurality of objects from any one position on the touch input window to another position on the touch input window.

10. The object search method of claim 1, wherein the step of displaying a list of a plurality of objects comprises:
    displaying the list in response to a user search command.

11. A terminal having an object search function, comprising:
    a display unit configured to display a list of a plurality of objects including a first object and a second object in a first screen area, and display a touch input window for touch input in a second screen area, the touch input window including one or more function keys; and
    a controller configured to move an object indicator from the first object to the second object on the list as a pointer is dragged from a first position to a second position on the touch input window,
    wherein the controller is configured to execute a function set in a first function key if the second position and the first function key are at least partially overlapped with each other, when the touch of the pointer on the second position is removed,
    wherein the first function key is located on a predetermined position on the touch input window, and
    wherein a region for receiving the touch input causing the movement of the object indicator is not provided on the first screen area.

12. The terminal of claim 11, wherein the first screen area and the second screen area are provided in one display or respectively in one of a plurality of displays.

13. The terminal of claim 11, wherein the second screen area is provided on a touch screen.

14. The terminal of claim 11, wherein the controller is configured to move the object indicator in proportion to at least one of a drag speed and a drag distance of the pointer.

15. The terminal of claim 11, wherein the controller is configured to move the object indicator correspondingly to a drag direction of the pointer.

16. The terminal of claim 11, wherein the controller is configured to vary a configuration of the one or more function keys according to an object type of the first object or an object type of the second object.

17. The terminal of claim 11, wherein the controller is configured to search the list of the plurality of objects from any one position on the touch input window to another position on the touch input window.

18. The terminal of claim 11, wherein the controller is configured to display the list in response to a user search command.

* * * * *